(12) United States Patent
Xie et al.

(10) Patent No.: US 10,109,843 B2
(45) Date of Patent: Oct. 23, 2018

(54) SEPARATOR FOR A RECHARGEABLE BATTERY

(71) Applicant: Hong Kong Applied Science and Technology Research Institute Company Limited

(72) Inventors: Laiyong Xie, Shen Zhen (CN); Pau Yee Lim, New Territories (HK)

(73) Assignee: Hong Kong Applied Science and Technology Research Institute Company Limited, Shatin (HK)

( * ) Notice: Subject to any disclaimer, the term of this patent is extended or adjusted under 35 U.S.C. 154(b) by 171 days.

(21) Appl. No.: 15/238,796

(22) Filed: Aug. 17, 2016

(65) Prior Publication Data

US 2018/0053928 A1    Feb. 22, 2018

(51) Int. Cl.
*H01M 2/14* (2006.01)
*H01M 2/34* (2006.01)
*H01M 2/16* (2006.01)

(52) U.S. Cl.
CPC ......... *H01M 2/348* (2013.01); *H01M 2/1653* (2013.01); *H01M 2/1686* (2013.01); *H01M 2200/10* (2013.01); *H01M 2220/30* (2013.01)

(58) Field of Classification Search
CPC ....................................................... H01M 2/14
See application file for complete search history.

(56) References Cited

U.S. PATENT DOCUMENTS

| 2009/0111025 A1 | 4/2009 | Lee et al. | |
| 2014/0030606 A1* | 1/2014 | Kojima | H01M 2/145 429/246 |
| 2014/0045033 A1 | 2/2014 | Zhang et al. | |
| 2015/0093627 A1* | 4/2015 | Busch | H01M 2/145 429/145 |
| 2015/0188108 A1 | 7/2015 | Miyazawa et al. | |

FOREIGN PATENT DOCUMENTS

| CN | 101296795 A | 10/2008 |
| CN | 101678662 A | 3/2010 |
| CN | 102569700 B | 1/2014 |
| CN | 103887464 | 6/2014 |
| CN | 104157811 | 11/2014 |
| CN | 104157811 A | 11/2014 |
| CN | 104600233 A | 5/2015 |
| CN | 104600233 | 6/2015 |
| CN | 105440770 A | 3/2016 |
| CN | 105849937 A | 8/2016 |
| EP | 294164542 | 2/2013 |

OTHER PUBLICATIONS

Translation (machine) of CN 102569700B.
International Search Report PCT/CN2016/096820 dated May 8, 2017.
Machine translations of the Abstracts of the attached Chinese references.

* cited by examiner

*Primary Examiner* — Jacob B Marks

(57) ABSTRACT

The invention provides a coating or film adapted to be arranged between a separator and at least one electrode of a rechargeable battery. The coating or film comprises a first material capable of forming a porous layer and allowing a passage of ions therethrough; wherein, in response to temperature change, the first material porous layer is adapted to substantially close pores in said first material porous layer to thereby substantially reduce or prevent further passage of ions through the first material.

17 Claims, 12 Drawing Sheets

SEPARATOR FOR A RECHARGEABLE BATTERY

FIELD OF THE INVENTION

The invention relates to the field of rechargeable batteries, particularly but not exclusively, to a separator for use in a rechargeable battery such as a lithium ion battery.

BACKGROUND OF THE INVENTION

Different rechargeable batteries such as lead-acid batteries, nickel cadmium (NiCd) batteries, nickel metal hydride (NiMH) batteries, and lithium ion (Li-ion) batteries have been developed and widely used. Among the various types of rechargeable batteries, lithium ion batteries are known to be commonly applied to consumer electronic products such as portable electronic devices due to their relatively compact size, light weight and high energy density. Nevertheless, lithium ion batteries are also know to present safety risks and may even be dangerous such as during a thermal runaway event, which may result in flaming or even an explosion of the battery. For example, thermal runaway in a faulty rechargeable battery may be caused by an internal short circuit of the battery due to an external impact or crash of the battery. The internal short circuit can cause heat generation which may shrink the battery separator, and can result in a more severe short circuit. Thermal runaway may also be caused by overcharging of a rechargeable battery which also generates excess heat. Traditionally, thermal runaway of the rechargeable battery can be prevented, minimized or reduced by avoiding generation of heat due to a short circuit, and/or providing heat resistant layers at the separator of the rechargeable battery.

OBJECTS OF THE INVENTION

An object of the present invention is to provide a separator coating or film for use in a rechargeable battery.

Another object of the present invention is to provide a separator for use in a rechargeable battery.

A further object of the present invention is to mitigate or obviate to some degree one or more problems associated with known separator coatings or films and separators for rechargeable batteries.

A further object of the present invention is to provide a rechargeable battery having a novel separator configured to reduce over heating of the battery.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In general, the invention provides a separator coating or film, and/or a separator with such coating or film, for use in a rechargeable battery such as, but not limited to, a lithium ion rechargeable battery. The invention can be provided in the form of a coating layer adapted to be disposed at or coated on one or more surfaces of the battery separator, and/or a prepared film layer adapted to be placed or arranged between one or more surfaces of the separator and one or more of the battery electrodes, i.e. the anode or the cathode. The separator is an ion permeable component, e.g. a membrane, placed between the battery anode and cathode. More particularly, the separator coating or film provides a "self-shutdown" mechanism responsive to temperature change to shut down reaction at the battery. To achieve this, the coating or film comprises a first material porous layer with pores fusible in response to elevated temperature due to excess heat generation. More specifically, the pores are open under normal operating temperatures to allow passage of ionic charge carriers such as lithium ions between the anode and the cathode, such as during discharging and recharging of the rechargeable battery. Under an abnormal operating condition in which excess heat is generated and/or accumulated such as, during a short circuit of the rechargeable battery, the pores of the first material porous layer are adapted to automatically close substantially when the temperature reaches or passes a certain predetermined threshold temperature. As a consequence, passage of ions are reduced, minimized or even prevented to thereby stop the chemical reaction and thus, reduce, minimize or prevent further heat generation. The coating or film may further comprise a second material for binding the first material porous layer to the separator and/or the electrodes to thereby reduce, minimize or prevent thermal shrinkage of the separator. The present invention is advantageous in that it allows an automatic, temperature-responsive shut-down mechanism effective in reducing, preventing or minimizing excess heat generation due to a short circuit or overcharge of a rechargeable battery which reduces the chances of potential safety hazards relating to the operation of the rechargeable battery such as thermal runaway.

In a first main aspect, the invention provides a coating or film adapted to be arranged between a separator and at least one electrode of a rechargeable battery. The coating or film preferably comprises a first material capable of forming a porous layer and allowing a passage of ions therethrough; wherein, in response to temperature change, the first material is adapted to substantially close pores in said first material porous layer to thereby substantially reduce, minimize or prevent further passage of ions through the layer.

In a second main aspect, the invention provides a rechargeable battery having a novel separator comprising a coating or film according to the first aspect.

In a third main aspect, the invention provides a method of manufacturing a rechargeable battery. The method comprises the step of providing a coating or film according to the first aspect between a separator and at least one electrode of the rechargeable battery.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
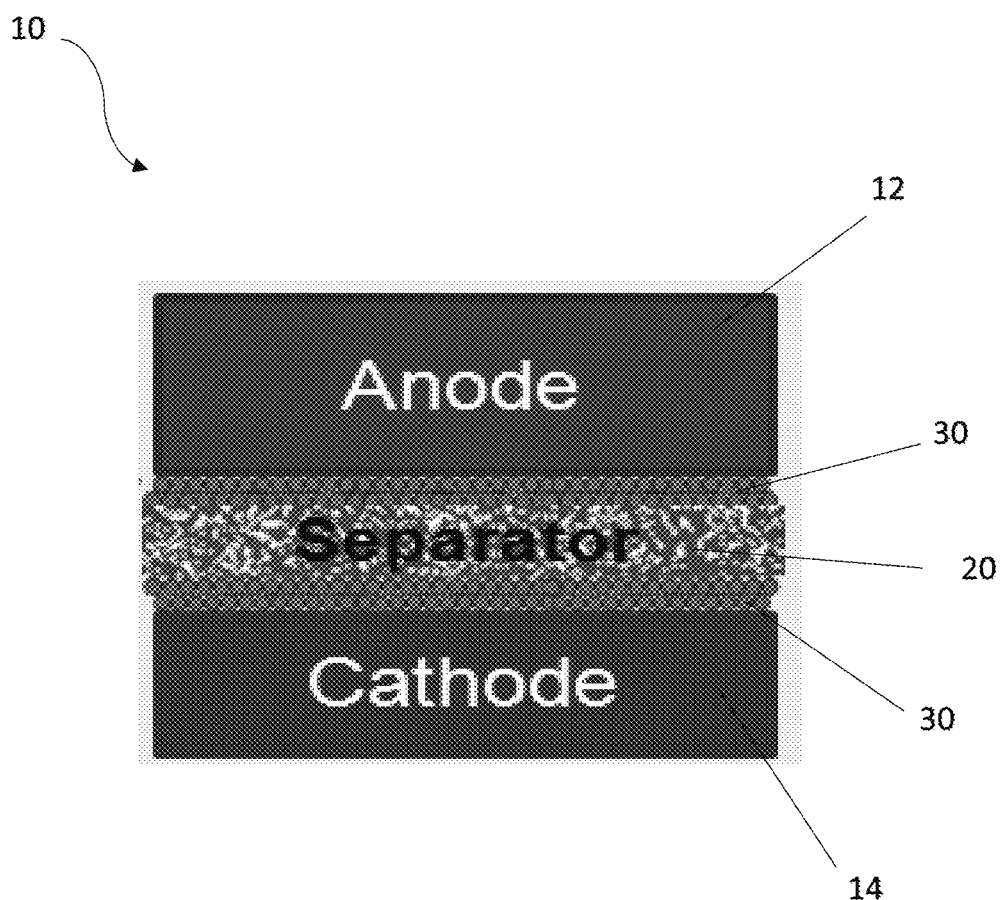
FIG. 1 is a side cross-sectional view showing a portion of a rechargeable battery comprising a separator coating or film according to a first embodiment of the present invention.

Referring to FIG. 1, shown is a partial view of a rechargeable battery 10 such as, but not limited to, a lithium ion rechargeable battery 10 having an anode 12 and a cathode 14 separated by a separator or membrane 20 which allows ionic charge carriers or ions of the liquid electrolyte to pass therethrough and to transport between the two electrodes so as to form a close electric circuit in the electrochemical cell. It is important for the separator 20 to be chemically and electrochemically stable with regard to the electrolyte and the electrodes, as well as mechanically strong enough to withstand some mechanical damage. Suitable materials for the separator 20 can be, but are not limited to, nylon, polyesters, glass fibers, polypropylene (PP), polyethylene (PE), poly(tetrafluoroethylene) (PTFE) and/or polyvinyl chloride (PVC).

Specifically, at least one coating or film 30 can be arranged between the separator 20 and one or more of the electrodes 12, 14. In one embodiment, the coating or film 30 can be provided in the form of a coating layer adapted to be deposited or coated on one or more surfaces of the separator 20. Alternatively, the coating or film 30 can be prepared in the form of a separate film layer adapted to be subsequently placed or arranged between the one or more surfaces of the separator 20 and one or more of the respective electrodes 12, 14.

Figure 2:
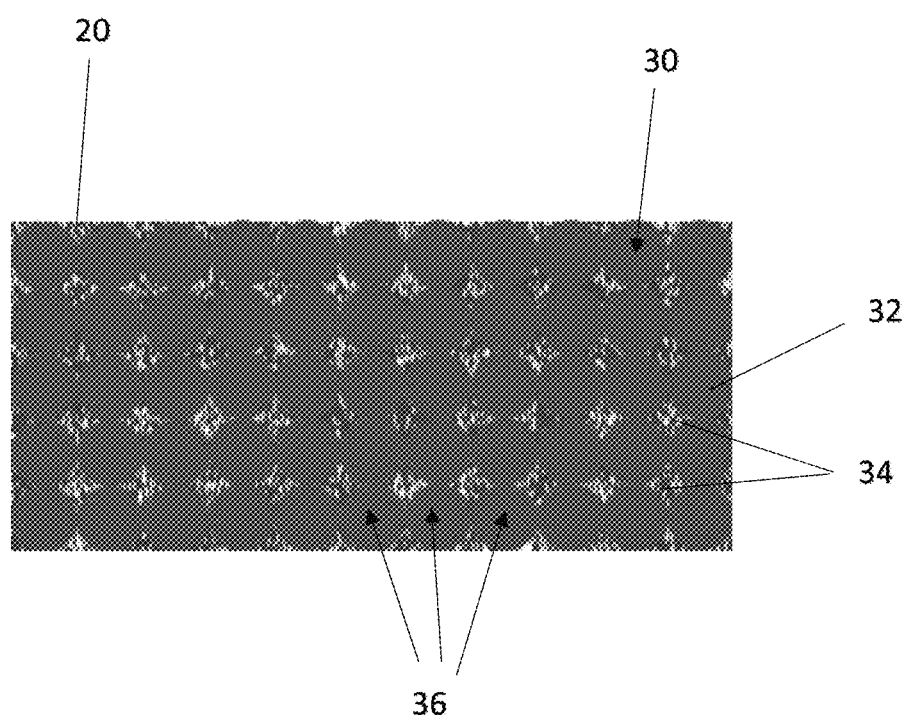
FIG. 2 is a top view showing a separator coating or film according to a second embodiment the present invention.

As more clearly shown in FIG. 2, the coating or film 30 comprises a first material porous layer 32 with pores or channels 34 capable of allowing a passage of ions therethrough. In response to temperature change such as an unexpected elevated temperature due to excessive heat generation, the first material 32 is adapted to substantially close the pores 34 in the first material porous layer 32 to thereby substantially reduce, minimize or prevent further passage of ions through the first material porous layer 32. As a consequence, the electric circuit is interrupted to some degree such that the electrochemical cell shuts down to thereby prevent further generation of heat. Safety hazards such as thermal runaway can thus be avoided or occurrences of such events substantially reduced. In one embodiment, the pores closure of the first material porous layer 32 is achieved by arranging the first material 32 to be capable of undergoing at least one phase change in response to the temperature change, during which the pores 34 of the first material porous layer 32 are adapted to substantially close to thereby substantially reduce, minimize or prevent further passage of ions through the first material porous layer 32.

In one embodiment, the first material porous layer 32 may comprise a plurality of particles 36 interconnected to form a porous network comprising the pores 34 of said first material 32. The plurality of particles 36 are adapted to fuse together in response to the temperature change to thereby substantially reduce in size, close or block the pores 34 of the porous network.

For example, the first material 32 is adapted to undergo a first phase change at a first temperature. The first temperature can be, for example, a glass-transition temperature ($T_g$) of the first material 32 at which the first material 32 starts to soften or deform to close the pores 34. The first material 32 may further be adapted to undergo a second phase change at a second temperature higher than the first temperature, such as a melting temperature ($T_m$), at which the first material porous layer 32 is melted and started to fall apart. This is applicable to a first material 32 which comprises, for example, one or more amorphous and semi-crystalline polymers.

In one embodiment, the first temperature and the second temperature may be covered by a range of melting temperatures ($T_m$) of the first material 32. For example, the range of melting temperatures ($T_m$) may comprise an initial melting temperature ($T_{m1}$) as the first temperature at which the first material porous layer 32 starts to melt. The melting may continue over a range of increasing temperatures at which the pores 34 are closed substantially. Eventually, the first material 32 may reach a melt down temperature ($T_{m2}$) as the second temperature, at which the first material porous layer 32 is melted down and fallen apart. This is applicable to a first material 32 which comprises, for example, one or more crystalline polymers.

Preferably, the second temperature and the first temperature are of a difference of at least 20° C. In one specific embodiment, the glass-transition temperature ($T_g$) falls at a range of about 80° C. to about 150° C., and the melting temperature ($T_m$) falls at a range of about 100° C. to about 250° C.

In one embodiment, the plurality of particles 36 of the first material porous layer 32 may comprise one or more polymeric materials formed of at least one of the following monomers: methyl methacrylate, methyl acrylate, ethyl methacrylate, ethyl acrylate, butyl methacrylate, butyl acrylate, isobutyl acrylate, isobutyl methacrylate, ethylhexyl methacrylate, ethylhexyl acrylate, 2-hydroxyethyl acrylate, 2-hydroxyethyl methacrylate, isooctyl acrylate, isooctyl methacrylate, lauryl acrylate, lauryl methacrylate, isodecyl acrylate, isodecyl methacrylate, acrylic acid, methacrylic acid, acrylic salt, methacrylic salt, acrylonitrile, methacrylonitrile, acrylamide, methacrylamide, styrene, divinyl benzene, epoxy resin, bisphenol A, ethylene oxide, fluorine-containing monomer, etc. although a person skilled in the art will be capable of selecting and applying any other materials suitable for the claimed purpose without deviating from the spirit and scope of the present invention. Depending on the synthetic and preparation processes, the plurality of particles 36 can be configured with one or more shapes comprising, but not limiting to, spheres, rods, cuboids, needles, cubes, ellipsoids, prisms, cones, tetrahedrals, irregular shaped particles and any combination thereof.

Figure 3:
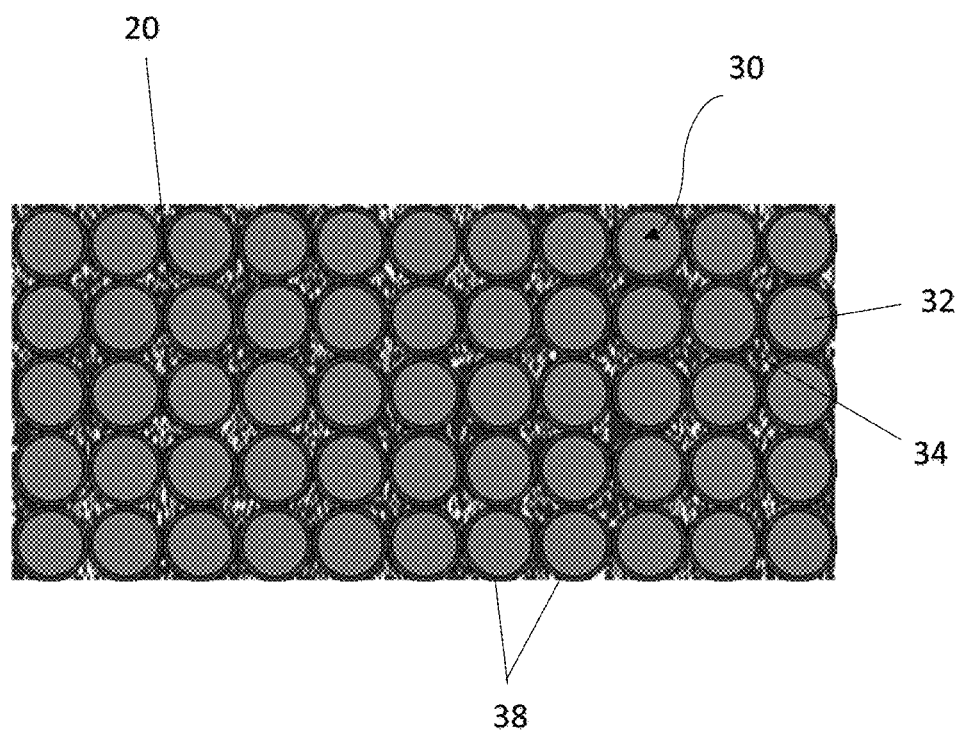
FIG. 3 is a top view showing the separator coating or film of FIG. 1.

Referring to FIG. 3, shown is another embodiment of the present invention in which the coating or film 30 includes a second material 38 deposited on one or more surfaces of the first material porous layer 32 for adhering the first material 32 to one or more respective surfaces of the separator 20 and the respective electrodes 12, 14, as well as possibly binding the particles of the first materials 32 to form the interconnected porous network. The second material 38 may comprise one or more polymeric materials formed of at least one of the following monomers: methyl methacrylate, methyl acrylate, ethyl methacrylate, ethyl acrylate, butyl methacrylate, butyl acrylate, isobutyl acrylate, isobutyl methacrylate, ethylhexyl methacrylate, ethylhexyl acrylate, 2-hydroxyethyl acrylate, 2-hydroxyethyl methacrylate, isooctyl acrylate, isooctyl methacrylate, lauryl acrylate, lauryl methacrylate, isodecyl acrylate, isodecyl methacrylate, acrylic acid, methacrylic acid, acrylic salt, methacrylic salt, acrylonitrile, methacrylonitrile, acrylamide, methacrylamide, styrene, divinyl benzene, epoxy resin, bisphenol A, ethylene oxide, fluorine-containing monomer, etc. although a person skilled in the art will be capable of selecting and applying any other materials suitable for the claimed purpose without deviating from the spirit and scope of the present invention.

Figure 4:
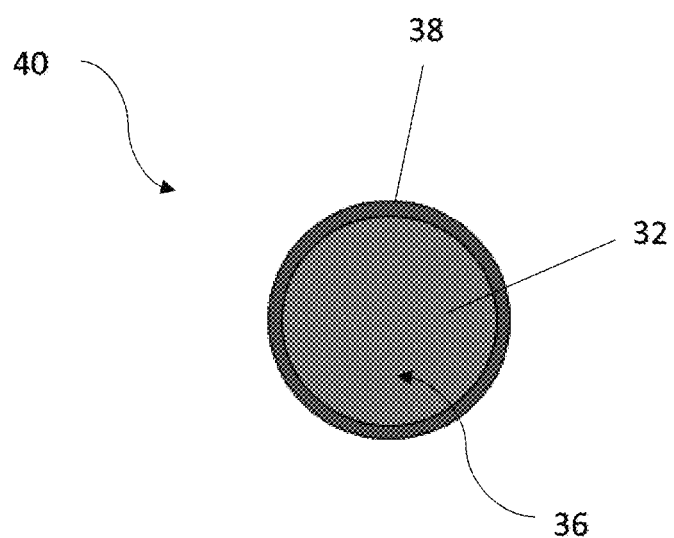
FIG. 4 is an enlarged view of a particle of the coating or film material as shown in FIG. 3.

The second, adhesive material 38 is adapted to suppress thermal shrinkage of the porous network of the first material 32, and thus the separator 20. As more clearly shown in FIG. 4, the first material 32 and the second material 38 are configured in a core-shell structure. In one specific embodiment, the second material 38 is adapted to adhere the first material 32 to at least one surface of the separator 20 and the respective electrodes 12, 14 at an adhesive strength ranged from 5 N/m to 50 N/m.

Figure 5:
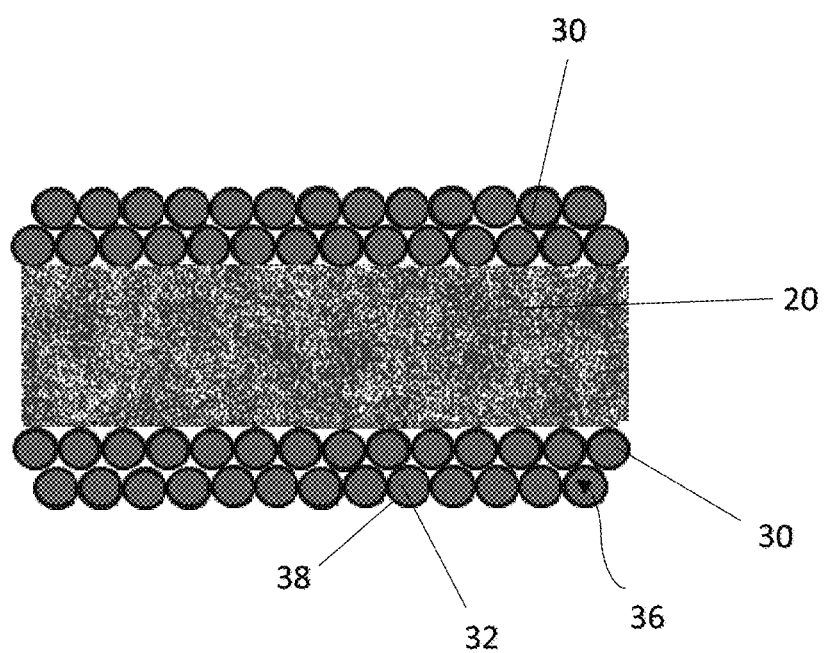
FIG. 5 is a side cross-sectional view showing arrangement of the coating or film of FIG. 3 at the separator.
Figure 6:
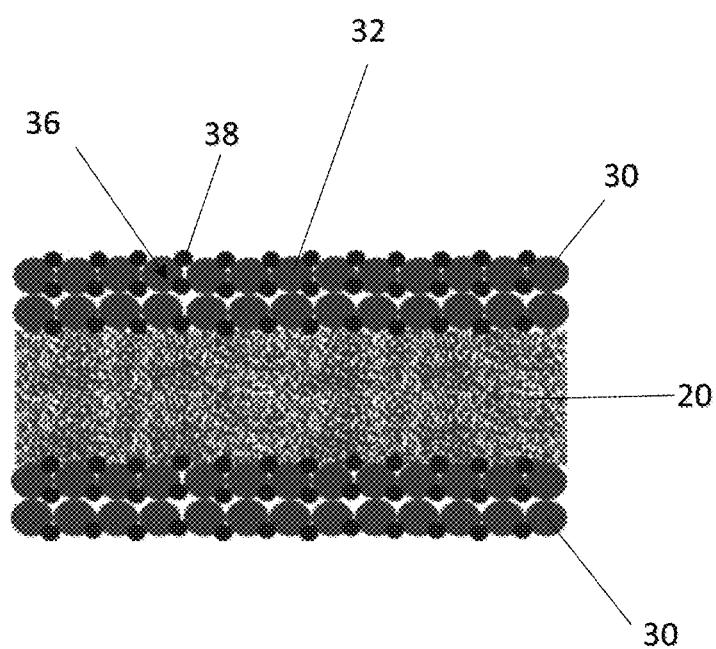
FIG. 6 is a side cross-sectional view showing arrangement of a coating or film according to a third embodiment of the present invention.
Figure 7:
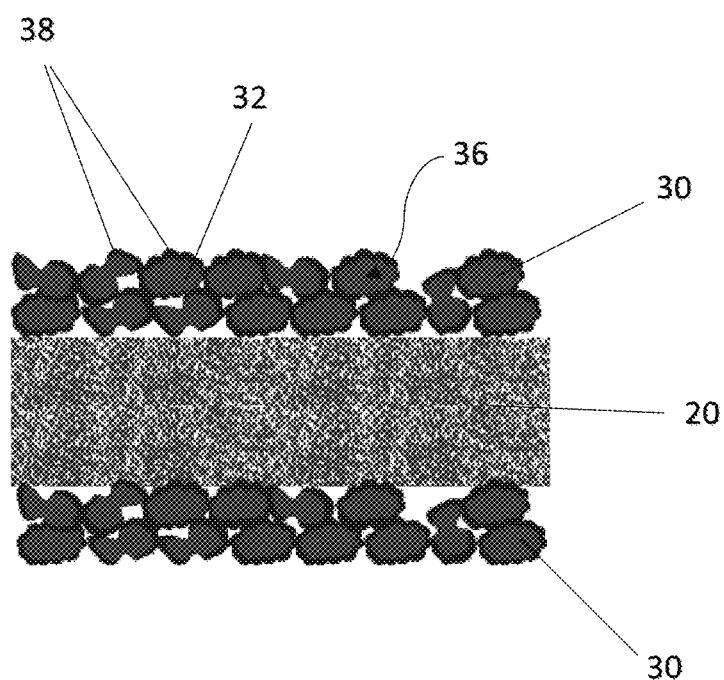
FIG. 7 is a side cross-sectional view showing arrangement of a coating or film according to a fourth embodiment of the present invention.
Figure 8:
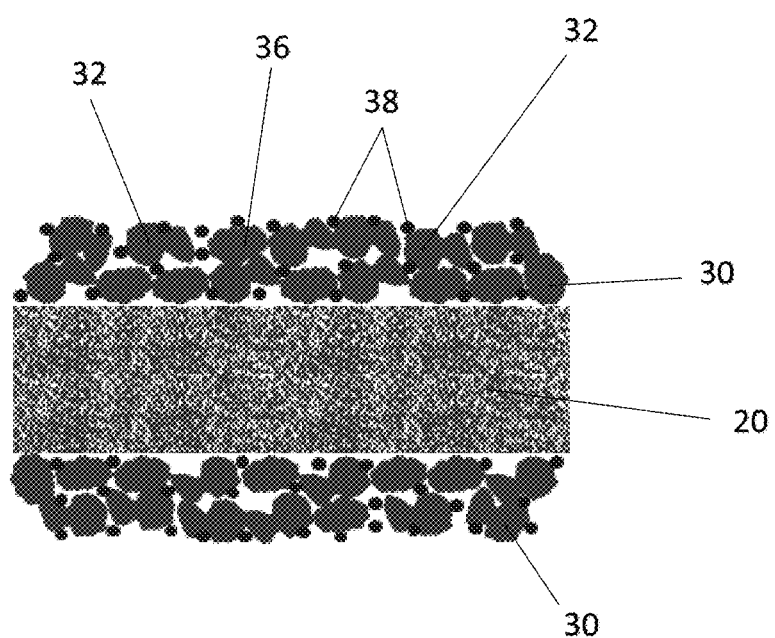
FIG. 8 is a side cross-sectional view showing arrangement of a coating or film according to a fifth embodiment of the present invention.
Figure 9:
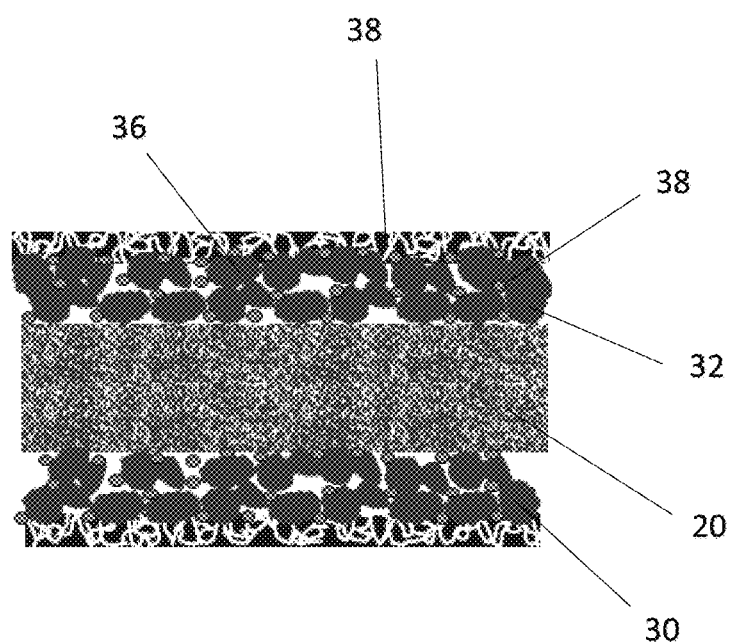
FIG. 9 is a side cross-sectional view showing arrangement of a coating or film according to a sixth embodiment of the present invention.

Various arrangements and configurations of the coating or film 30 having the first and the second materials 32, 38 are further illustrated in FIGS. 5 to 9. For example, spherical particles 40 with a core-shell structure, i.e. with the first material 32 forming the core and the second material 38 forming the shell, are shown in FIG. 5. FIG. 6 shows an embodiment having regularly shaped particles 36 of the first material 32, with the second material 38 being dispersed in layers among the particles 36 of the first material 32. FIG. 7 shows another embodiment having irregularly shaped particles 36 of the first material 32, with surfaces being partially or substantially covered by the second material 38. FIG. 8 shows a further embodiment having irregularly shaped particles 36 of the first material 32, with the second material 38 being randomly dispersed among the particles 36 of the first material 32. FIG. 9 shows a further embodiment with irregularly shaped particles 36 of the first material 32, with the second material 38 being randomly dispersed among the particles 36 and also, forming a top, porous layer above the first material 32 and adjacent the respective electrodes 12, 14 and serving as an adhesive layer between the porous network of the first material 32 and the respective electrodes 12, 14.

Figure 10:
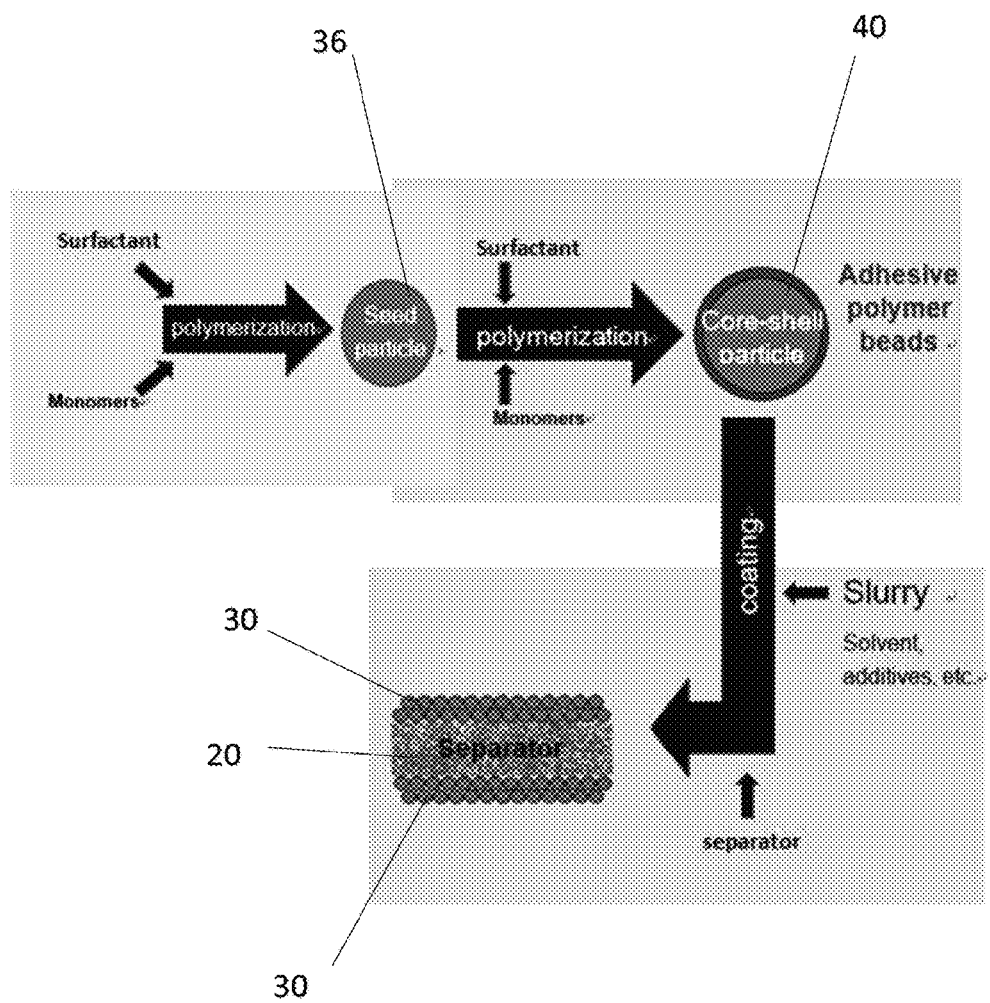
FIG. 10 is a flow diagram showing synthetic and preparation process of a separator with a coating or film embodied in the present invention.

An embodied synthetic and preparation process of the coating or film 30 comprising the first and the second materials 32, 38, and the subsequent coating at the separator 20 is shown in FIG. 10. First, seed particles 36 of the first material 32 can be synthesized by known polymerization techniques such as emulsion polymerization in the presence of one or more surfactants and monomers. Examples of the surfactants can be, but are not limited to, ammonium ethoxylated alkyl sulfate and/or poly(ethylene oxide) (PEO); and examples of the monomers can be, but are not limited to, methyl methacrylate, acrylic acid, methacrylic acid, acrylamide, styrene and/or divinyl benzene. After the seed particles 36 are synthesized, further polymerizations such as seed emulsion polymerization can be performed in the presence of one or more surfactants and monomers to provide coating of the second material 38 onto the seed particles of the first material 32 to form adhesive particles 40 with a core-shell structure. Examples of the surfactants can be, but are not limited to, ammonium ethoxylated alkyl sulfate and/or poly(ethylene oxide) (PEO); and examples of the monomers can be, but are not limited to, methyl methacrylate butyl acrylate and/or lauryl acrylate.

The adhesive particles 40 may then be dispersed in one or more solvents and optionally, in the presence of one or more additives such as thickener to form a slurry of coating material. The slurry may then be cast onto the separator 20 by one or more processes such as gravure, dipping and/or slot-die.

Figure 11:
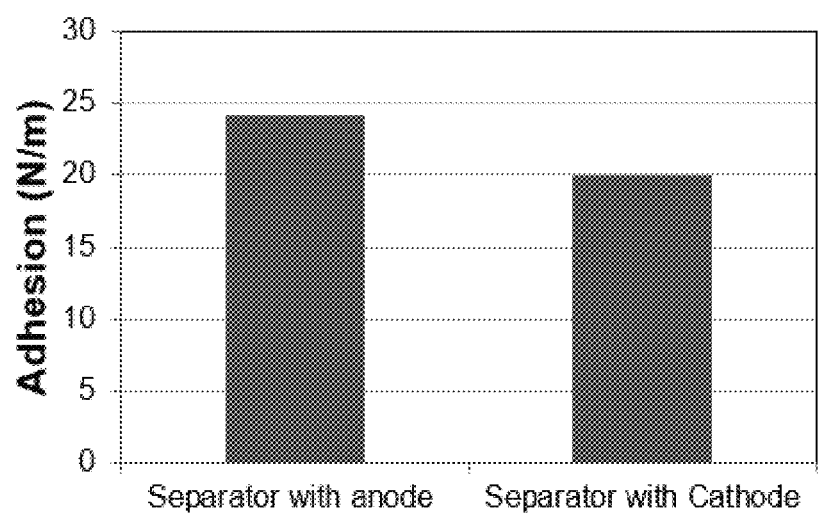
FIG. 11 shows the strength of adhesion between respective electrodes and a separator embodied in the present invention.
Figure 12:
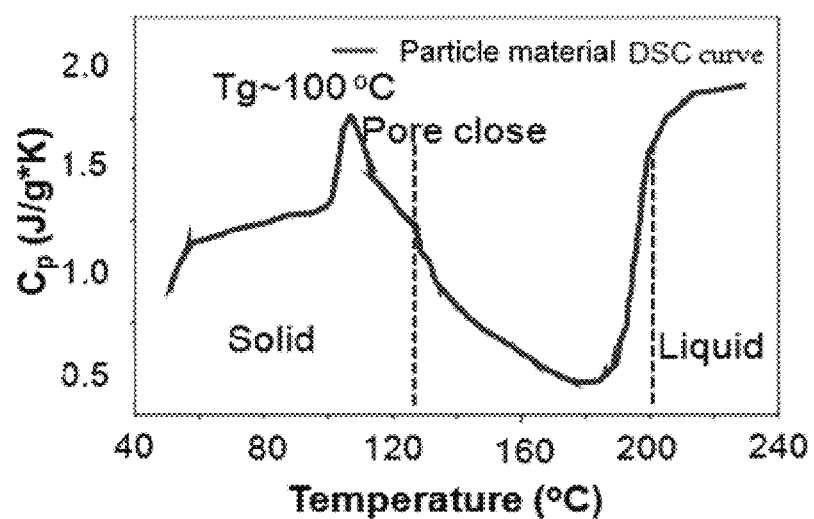
FIG. 12 shows the specific heat capacity verse temperature of a coating or film material according an embodiment of the present invention.

The coating or film 30 comprising the first material 32 and the second, adhesive material 38 has been characterized by various analytical techniques to demonstrate the advantageous properties of the present invention. For example, FIG. 11 shows the adhesive strength of the separator coating or film 30 comprising adhesive particles 40 in a core-shell structure. In this specific embodiment, the adhesive strength between the separator coating or film 30 and the anode 12 is found to be about 24 N/m, and the adhesive strength between the separator coating or film 30 and the cathode 14 is found to be about 20 N/m. FIG. 12 shows the differential scanning calorimetric (DSC) analysis of an embodied separator coating or film 30 which revealed a glass transition temperature ($T_g$) of about 100° C. The present invention further relates to a separator of a rechargeable battery such as a lithium ion battery comprising the coating or film as described above. The present invention also relates to a rechargeable battery such as a lithium ion battery having such a separator, and a method of manufacturing the rechargeable battery by providing the described coating or film between a separator and at least one electrode of the rechargeable battery.

The present invention is advantageous in that it allows an automatic, temperature-responsive, self-shut down mechanism for a rechargeable battery separator effective in preventing, minimizing or reducing excess heat generation due to a short circuit of a rechargeable battery which reduces, minimizes or prevents chances of potential safety hazards relating to the operation of the rechargeable battery such as thermal runaway. Particularly, the coating or film is adapted to allow ion transfer at a temperature below 80° C., and to actuate pore closure by fusion of the particles at a temperature between 80° C. to 150° C. to "shut-down" the reaction of the electrochemical cell. The particle fusion preferably happens at or above the first temperature, which is generally the glass transition temperature ($T_g$) or the initial melting temperature ($T_{m1}$) of the first material at which the first material is started to melt. A preferred difference of at least 20° C. between the first temperature and the second temperature, which is generally the fallen apart temperature of the first material layer, is required to allow sufficient time for a substantial closure of pores before the coating or film is substantially melted down and fallen apart.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A coating or film adapted to be arranged between a separator and at least one electrode of a rechargeable battery, the coating or film comprising:

a first material capable of forming a porous layer and allowing a passage of ions therethrough;

wherein, in response to temperature change, the first material is adapted to undergo a first phase change during which the pores of said first material porous layer are adapted to substantially close to thereby substantially reduce or prevent further passage of ions through said first material porous layer, said first material undergoing said first phase change at a first temperature comprising a glass-transition temperature at which the first material starts to soften.

2. The coating or film according to claim 1, wherein the first material porous layer comprises a plurality of particles interconnected to form a porous network comprising the pores of said first material porous layer.

3. The coating or film according to claim 2, wherein the plurality of particles are adapted to fuse together in response to the temperature change to thereby substantially close or block the pores of the porous network.

4. The coating or film according to claim 1, wherein the first temperature is a melting temperature at which the first material starts to melt.

5. The coating or film according to claim 1, wherein the first material is adapted to undergo a second phase change at a second temperature higher than the first temperature.

6. The coating or film according to claim 5, wherein the second temperature is a melting temperature at which the first material is melted and fallen apart.

7. The coating or film according to claim 1, wherein the glass-transition temperature is at a range of about 80° C. to about 150° C.

8. The coating or film according to claim 4, wherein the melting temperature is at a range of about 100° C. to about 250° C.

9. The coating or film according to claim 5, wherein the second temperature and the first temperature have a difference of at least 20° C.

10. The coating or film according to claim 2, wherein the plurality of particles are of one or more shapes comprising sphere, rod, cuboid, needle, cube, ellipsoid, prism, cone, tetrahedral, irregular and a combination thereof.

11. The coating or film according to claim 1, further comprising a second material deposited at the first material for adhering the first material with one or more respective surfaces of the separator and the at least one electrode.

12. The coating or film according to claim 11, wherein the second material is adapted to disperse among the first material.

13. The coating or film according to claim 11, wherein the second material is adapted to cover the plurality of particles to form core-shell structures.

14. The coating or film according to claim 11, wherein the second material is adapted to disposed at at least one junction between: the first material and the respective surface of the separator, and the first material and the respective surface of the at least one electrode.

15. The coating or film according to claim 11, wherein the plurality of particles are interconnected via the second material.

16. A rechargeable battery having a separator comprising a coating or film according to claim 1.

17. A method of manufacturing a rechargeable battery, the method comprising the step of:

providing a coating or film according to claim 1 between a separator and at least one electrode of the rechargeable battery.

* * * * *